US009395867B2

(12) United States Patent
Griffin et al.

(10) Patent No.: US 9,395,867 B2
(45) Date of Patent: Jul. 19, 2016

(54) METHOD AND SYSTEM FOR DISPLAYING AN IMAGE ON AN ELECTRONIC DEVICE

(75) Inventors: Jason T. Griffin, Waterloo (CA); Mihal Lazeridis, Waterloo (CA); Todd Wood, Waterloo (CA); Harry Richmond Major, Waterloo (CA); David Paul Yach, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1126 days.

(21) Appl. No.: 12/394,307

(22) Filed: Feb. 27, 2009

(65) Prior Publication Data
US 2010/0088596 A1 Apr. 8, 2010

Related U.S. Application Data

(60) Provisional application No. 61/103,910, filed on Oct. 8, 2008.

(51) Int. Cl.
*G06F 3/048* (2013.01)
*G06F 3/0481* (2013.01)
*G06F 3/041* (2006.01)
*G06F 3/0484* (2013.01)
*G06F 3/0488* (2013.01)

(52) U.S. Cl.
CPC .............. *G06F 3/0481* (2013.01); *G06F 3/041* (2013.01); *G06F 3/04845* (2013.01); *G06F 3/04883* (2013.01); *G06F 2203/04806* (2013.01)

(58) Field of Classification Search
CPC ................ G06F 3/016–3/017; G06F 3/03547; G06F 3/0414; G06F 3/0416; G06F 3/044; G06F 3/0481–3/04883; G06F 2203/014; G06F 2203/04105; G06F 2203/04806
USPC ......................................................... 715/702
See application file for complete search history.

(56) References Cited

U.S. PATENT DOCUMENTS 5,075,673 A * 12/1991 Yanker .......................... 345/163
5,615,384 A    3/1997 Allard et al.
(Continued)

FOREIGN PATENT DOCUMENTS

EP          1505484 A    2/2005
GB          2344894 A    6/2000
(Continued)

OTHER PUBLICATIONS

Karp, D.A., O'Reilly, T., Mott, T., "Windows XP in a Nutshell", Apr. 2002, O'Reilly Media Inc., Chapter 2, Sections "Point and Click Operations" and "Default Behavior", pp. 10-12.*
(Continued)

*Primary Examiner* — Claudia Dragoescu
(74) *Attorney, Agent, or Firm* — Thomas Grzesik; Fleit Gibbons Gutman Bongini & Bianco P.L.

(57) ABSTRACT

A method and method for displaying an image via a graphical user interface on a touch-sensitive display of an electronic device includes detecting a predetermined relation between a selection tool and the image. The image is panned in response to movement of the selection tool along the touch-sensitive display. The image is zoomed on in response to depression of the touch-sensitive display. An optional cursor may be activated upon detection of a first tap of the selection tool on the touch-sensitive display.

35 Claims, 7 Drawing Sheets

(56) References Cited

U.S. PATENT DOCUMENTS

| | | | |
|---|---|---|---|
| 5,825,308 | A | 10/1998 | Rosenberg |
| 5,825,352 | A | 10/1998 | Bisset et al. |
| 6,028,271 | A | 2/2000 | Gillespie |
| 6,587,097 | B1 * | 7/2003 | Aufderheide et al. ........ 345/173 |
| 6,774,890 | B2 | 8/2004 | Engholm |
| 6,933,925 | B1 * | 8/2005 | Gibbons et al. ............... 345/163 |
| 7,096,454 | B2 | 8/2006 | Damm |
| 7,158,878 | B2 * | 1/2007 | Rasmussen et al. .......... 701/208 |
| 7,336,263 | B2 | 2/2008 | Valikangas |
| 2003/0095096 | A1 | 5/2003 | Robbin |
| 2003/0193481 | A1 | 10/2003 | Sokolsky |
| 2004/0021644 | A1 | 2/2004 | Enomoto |
| 2004/0141010 | A1 | 7/2004 | Fitzmaurice |
| 2006/0026521 | A1 * | 2/2006 | Hotelling et al. ............. 715/702 |
| 2006/0181517 | A1 | 8/2006 | Zadesky |
| 2006/0197753 | A1 * | 9/2006 | Hotelling ...................... 345/173 |
| 2006/0238517 | A1 * | 10/2006 | King et al. .................... 345/173 |
| 2006/0250377 | A1 * | 11/2006 | Zadesky et al. ............... 345/173 |
| 2007/0040810 | A1 * | 2/2007 | Dowe et al. ................... 345/173 |
| 2008/0122796 | A1 * | 5/2008 | Jobs et al. ..................... 345/173 |
| 2008/0191864 | A1 | 8/2008 | Wolfsen |
| 2008/0204476 | A1 | 8/2008 | Montague |
| 2009/0008234 | A1 * | 1/2009 | Tolbert et al. ................. 200/600 |

FOREIGN PATENT DOCUMENTS

| | | |
|---|---|---|
| GB | 2402105 A | 12/2004 |
| JP | 10039748 A | 2/1998 |
| JP | 2000163193 A | 6/2000 |
| KR | 2004057131 A | 7/2004 |
| WO | 9938149 A | 7/1999 |
| WO | 9954807 A | 10/1999 |
| WO | 0102949 A | 1/2001 |
| WO | 03098421 A | 11/2003 |
| WO | 2005114369 A2 | 12/2005 |
| WO | 2006020305 A | 2/2006 |
| WO | WO-2006/126055 | 11/2006 |
| WO | WO-2007/019193 | 2/2007 |
| WO | 2008086306 A | 7/2008 |
| WO | WO-2008/101224 | 8/2008 |
| WO | WO-2008/106273 | 9/2008 |

OTHER PUBLICATIONS

"T-Mobile G1 User Guide R1.0", Sep. 12, 2008, pp. 16, 62-63.*
EP09154009.6 Summons to Oral Proceedings (Mar. 5, 2010).
European Search Report; EP 09154009.6; issued Jun. 29, 2009.
Written Opinion of The International Searching Authority mailed Nov. 5, 2009. In corresponding application No. PCT/CA2009/001337.
Examination Report mailed Oct. 6, 2009. In corresponding application No. 09154009.6.
International Search report mailed Feb. 26, 2007. In corresponding application No. PCT/US2005/025657.
International Search report mailed Nov. 5, 2009. In corresponding application No. PCT/CA2009/001337.
iPhone for Web Developers—http://mobrule.wordpress.com/2007/08/17/iphone-double-tap-zoomindistinguishable-from-magic/. Retrieved Aug. 17, 2007.
Mobile/UI/Designs/TouchScreen/Proposal3—https://wiki.mozilla.org/Mobile/UI/Designs/TouchScreen/Proposal3. Retrieved from the Internet—Feb. 26, 2008.
Korean Office Action corresponding application, application No. 10-2011-7008205, dated Sep. 18, 2012, 6 pages.
Canadian Intellectual Property Office Action dated Jul. 17, 2013.

* cited by examiner

METHOD AND SYSTEM FOR DISPLAYING AN IMAGE ON AN ELECTRONIC DEVICE

CROSS REFERENCE TO RELATED APPLICATIONS

The present application claims priority benefit to U.S. Provisional Application 61/103,910, filed Oct. 8, 2008, which application is expressly incorporated by reference herein.

FIELD OF TECHNOLOGY

The present application relates generally to handheld electronic communication devices having touch-sensitive displays, including but not limited to systems and methods for modifying screen content within a graphical user interface including panning and zooming of images displayed on the touch-sensitive display.

BACKGROUND

With the proliferation of more robust wireless communications systems, advancements of wireless handheld electronic communication devices are becoming more feasible. Handheld electronic communication devices provide a variety of functions including, for example, telephonic, electronic messaging and other personal information manager (PIM) application functions. Handheld electronic communication devices include mobile stations such as simple cellular telephones, smart telephones, wireless PDAs, and laptop computers with wireless 802.11 or BLUETOOTH® capabilities.

Touch-sensitive displays with input/output capabilities are particularly useful on handheld electronic communication devices because limited space is available for user input and device output within the physical area of the device. Liquid crystal displays with touch-sensitive overlay may be used as displays in handheld electronic communication devices. These displays, however, suffer from disadvantages. For example, the relatively small size of handheld electronic communication devices results in reduced size of images displayed on the touch-sensitive display. The touch-sensitive display is capable of displaying a variety of images such as graphical objects, virtual keyboards, webpages, maps, web-browser icons, pull-down menus, and the like. The size of the images may require that the user zoom or pan the image in order to more fully appreciate the image or display a portion of the image not shown.

An improved touch-sensitive display is desirable.

BRIEF DESCRIPTION OF THE DRAWINGS

Embodiments of the present application will now be described, by way of example only, with reference to the attached figures, wherein.

DETAILED DESCRIPTION

For simplicity and clarity of illustration, reference numerals may be repeated among the figures to indicate corresponding or analogous elements. In addition, numerous specific details are set forth in order to provide a thorough understanding of the example embodiments described herein. The example embodiments described herein may be practiced without these specific details. In other instances, methods, procedures and components have not been described in detail so as not to obscure the embodiments described herein. Also, the description is not to be considered as limiting the scope of the embodiments described herein.

Figure 1:
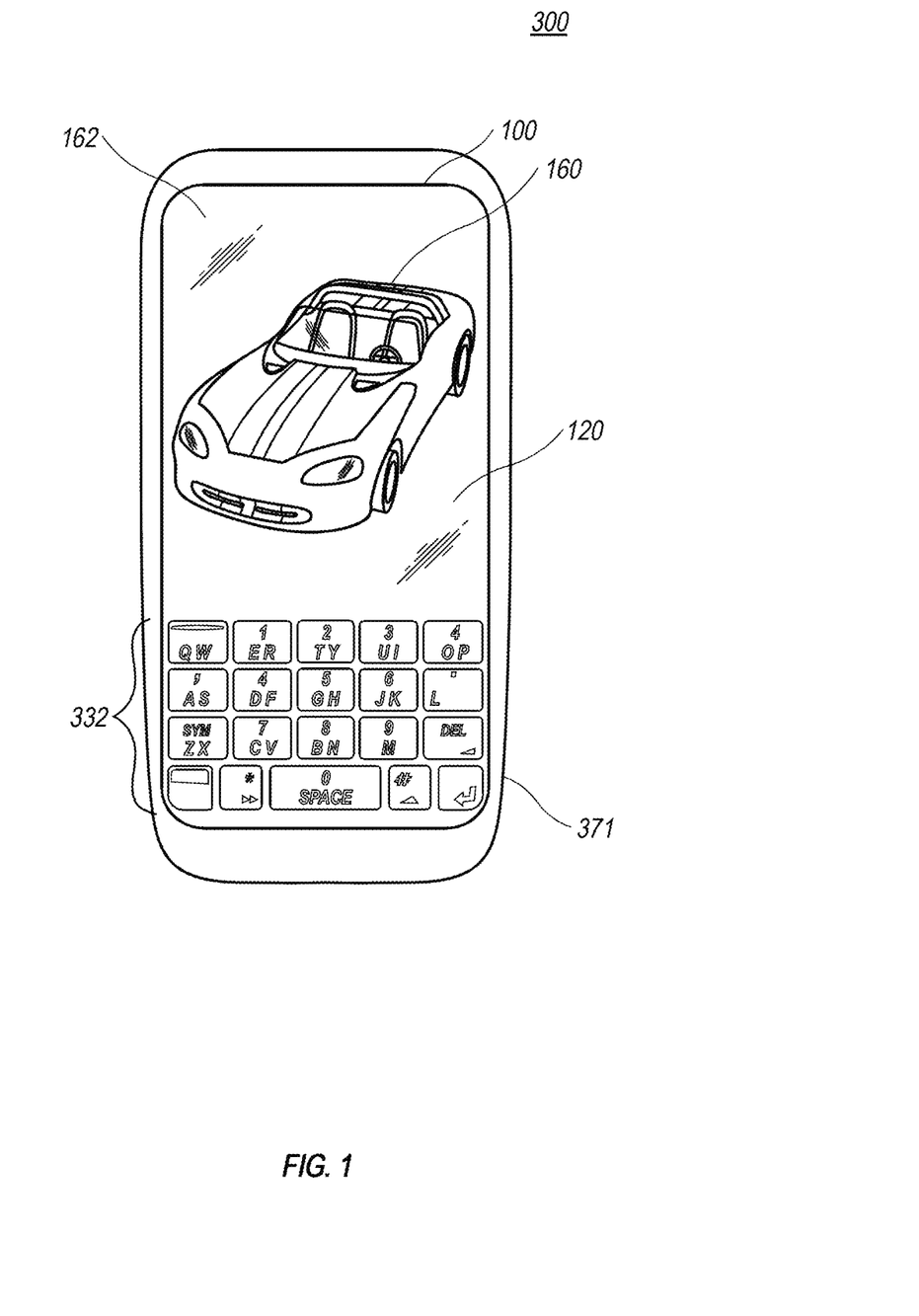
FIG. 1 illustrates an example electronic device having an image displayed on a touch-sensitive display.
Figure 2:
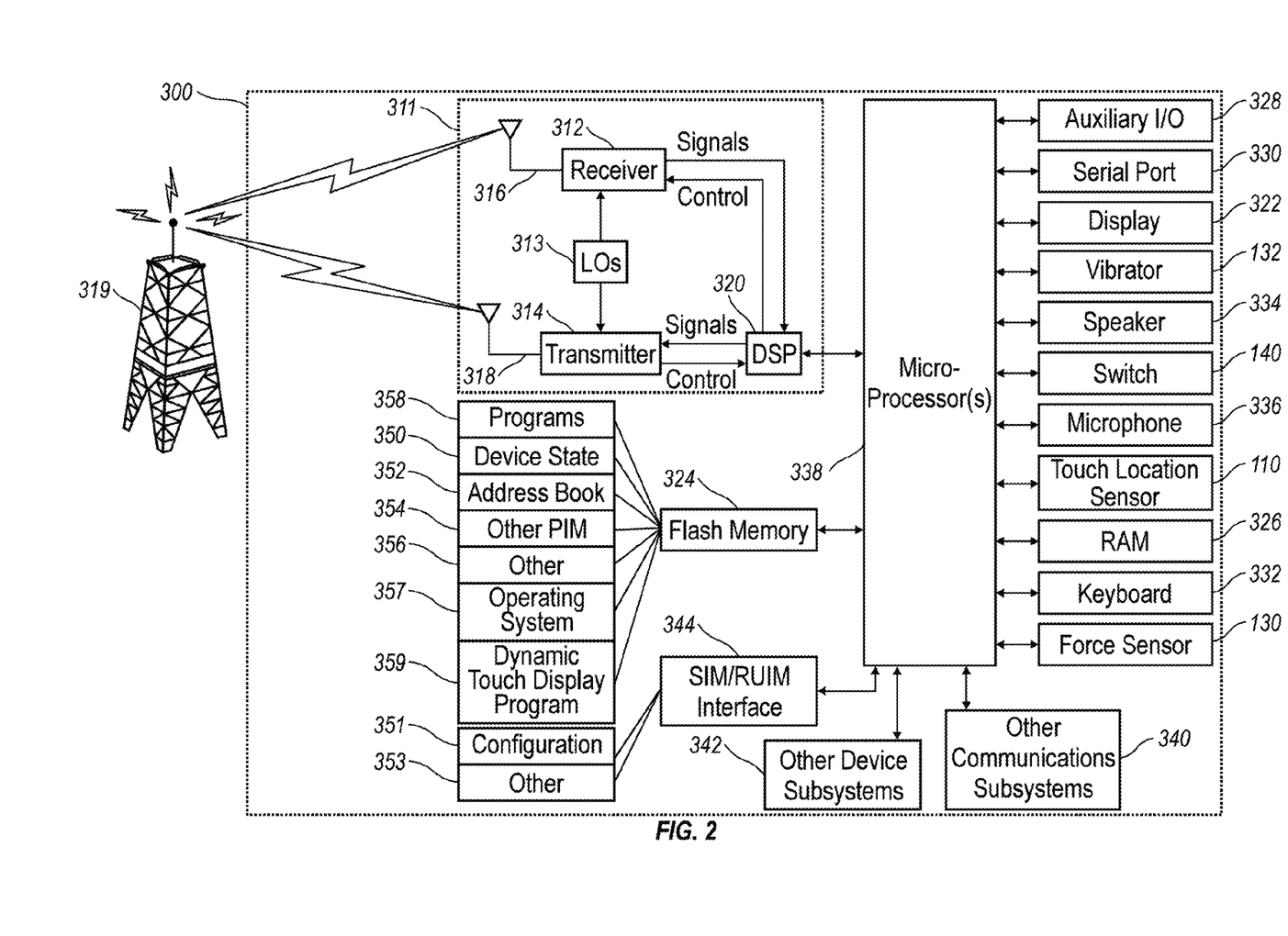
FIG. 2 is a block diagram representing an example electronic device interacting in a communication network.

An example electronic device 300 is shown in FIG. 1, and the device's cooperation in a wireless network 319 is shown in the block diagram of FIG. 2. The embodiments are depicted in the figures by way of example only, and those persons skilled in the art understand the additional elements and modifications necessary to make the electronic device 300 work in particular network environments. Although the electronic device 300 in FIG. 1 illustrates a handheld communication device, the electronic device 300 may comprise a handheld wireless communication device, a personal digital assistant (PDA), laptop computer, desktop computer, a server, or other communication device.

As shown in the block diagram of FIG. 2, the electronic device 300 includes a microprocessor 338 that controls the operation of the electronic device 300. A communication subsystem 311 performs all communication transmission and reception with the wireless network 319. The microprocessor 338 further may be connected with an auxiliary input/output (I/O) subsystem 328 that may be connected to the device 300. Additionally, in at least one embodiment, the microprocessor 338 is connected to a serial port (for example, a Universal Serial Bus port) 330 that facilitates communication with other devices or systems via the serial port 330. A display 322 is connected to microprocessor 338 to facilitate display of information to an operator of the device 300. When the electronic device 300 is equipped with a keyboard 332, which maybe physical or virtual, the keyboard 332 is connected to the microprocessor 338. The electronic device 300 may include a speaker 334, a microphone 336, random access memory 326 (RAM), and flash memory 324, all of which are advantageously connected to the microprocessor 338. Additionally, a vibrator 132, which may be a vibrator motor, may be connected with the microprocessor 338 to generate vibrations in the electronic device 300. Other similar components may be provided on the device 300 as well and optionally connected to the microprocessor 338. Other communication subsystems 340 and other communication device subsystems 342 are generally indicated as functionally connected with the microprocessor 338 as well. An example of a communication subsystem 340 is a short range communication system such as a BLUETOOTH® communication module or a WI-FI® communication module (a communication module in compliance with IEEE 802.11b) and associated circuits and components. Additionally, the microprocessor 338 performs operating system functions and enables execution of programs on the electronic device 300. In some embodiments, not all of the above components may be included in the electronic device 300. For example, in at least one embodiment, the keyboard 332 is not provided as a separate component and is instead integrated with a touch-sensitive display 100 as described below.

The body 371 of the electronic device 300 houses a touch-sensitive display 100 comprising a display screen 322, a switch 140, touch location sensor 110, and a transparent cover lens 120. See FIG. 3 and its associated text for further details regarding the touch-sensitive display 100. Other auxiliary I/O subsystems may include external display devices and externally connected keyboards (not shown). While the above examples are provided in relation to the auxiliary I/O subsystem 328, other subsystems capable of providing input or receiving output from the electronic device 300 are considered within the scope of this disclosure. Additionally, other keys may be placed along the side of the electronic device 300 to function as escape keys, volume control keys, scrolling keys, power switches, or user programmable keys, and may likewise be programmed accordingly. In another embodiment, the touch-sensitive display 100 may be integrated with a keyboard 332 having depressible keys. In such an embodiment, the touch-sensitive display 100 may provide navigation control and the keyboard 332 may provide text entry control.

Figure 3:
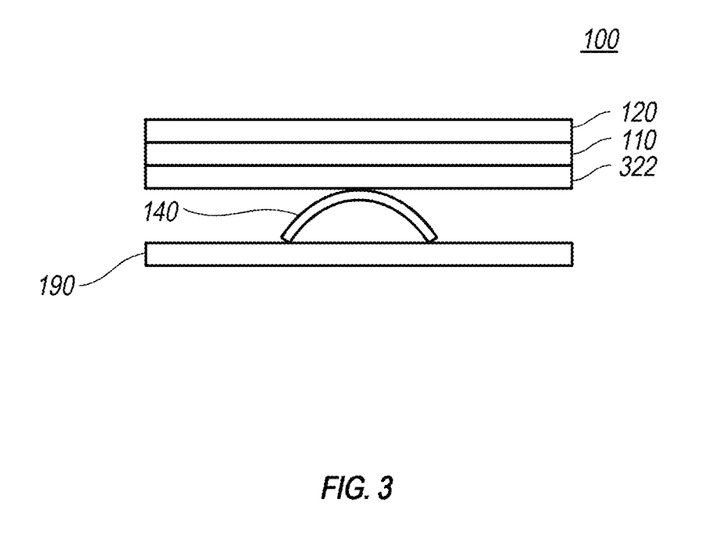
FIG. 3 illustrates the side profile view of the touch-sensitive display of the electronic device shown in FIG. 1.

Other components that may be connected to the microprocessor 338 include a switch 140, which may include a pressure sensor, one or more force sensors 130, and a touch location sensor 110. Although only one switch 140 and a touch location sensor 110 are illustrated in FIG. 3, a plurality of switches 140 and touch location sensors 110 may be provided. The touch-sensitive display 100, as illustrated in FIG. 3, comprises a display screen 322, a switch 140, touch location sensor 110, and a transparent cover lens 120. The touch location sensor 110 may be provided on all of or a part of the display screen 322 (not illustrated). Alternatively, the touch location sensor 110 may be a separate component that is provided as part of the touch-sensitive display 100. Although the touch location sensor 110 is shown located above the display screen 322, the touch location sensor 110 may optionally be located below the display screen 322. The touch location sensor 110 may be a capacitive, resistive, or other touch sensitive sensor. The display screen 322 may be a liquid crystal display (LCD) or a light emitting diode (LED) display. The display screen 322 may be another type of device that visually displays information.

In the example embodiment illustrated in FIG. 3, the switch 140 is mounted beneath and in the middle of the display screen 322. The switch 140 may optionally be mounted under the transparent cover lens 120. The placement of the switch 140 may optionally be in any location that facilitates sensing or detecting of the force applied to the surface of the touch-sensitive display 100. The switch 140 may in turn be affixed to a substrate 190, which may include a printed circuit board (PCB). In at least one embodiment the switch 140 is a dome switch housed inside a mounting structure that accommodates the connection of the switch 140 to the substrate 190. The mounting structure may be configured such that a gap is created between the dome switch and the substrate 190. In other embodiments, the mounting structure is affixed to an intermediary board (not shown) that is in turn connected to the substrate 190. Some examples of switches 140 include but are not limited to dome switches, contact switches, pressure switches, and the like.

The electronic device 300 is equipped with components to enable operation of various programs as shown in FIG. 2. In an example embodiment, the flash memory 324 is enabled to provide a storage location for the operating system 357, device programs 358, and data. The operating system 357 is generally configured to manage other programs 358 that are also stored in memory 324 and executable on the processor 338. The operating system 357 handles requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so forth. In addition, operators interact directly with the operating system 357 through a user interface, typically including the keyboard 332 and display screen 322. The operating system 357 may be stored in flash memory 324, read-only memory (ROM), or other suitable storage elements (not shown). The operating system 357, device program 358, or parts thereof may be loaded in RAM 326 or other volatile memory.

The flash memory 324 may advantageously contain programs 358 for execution on the electronic device 300, as well as an address book 352, a personal information manager (PIM) 354, and the device state 350. Furthermore, programs 358 and other information 356 including data may be segregated upon storage in the flash memory 324 of the electronic device 300.

When the electronic device 300 is enabled for two-way communication within the wireless communication network 319, signals are transmitted and received signals through a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that may be used for data and voice, or only data or only voice. For some systems, such as the systems listed above, the electronic device 300 may require a unique identifier to enable the electronic device 300 to transmit to and receive signals from the communication network 319. Other systems may not require such identifying information. GPRS, UMTS, and EDGE use a Subscriber Identity Module (SIM) in order to facilitate communication with the communication network 319. Likewise, most CDMA systems use a Removable User Identity Module (RUIM) to communicate with the CDMA network. The SIM/RUIM card may be used in multiple different electronic devices 300. Although the electronic device 300 may be able to perform some functions and provide some features without a SIM/RUIM card, communication with the network 319 is generally not be possible without such a card. A SIM/RUIM interface 344, located within the electronic device 300, interfaces the SIM/RUIM card to the microprocessor 338 and facilitates removal and insertion of a SIM/RUIM card (not shown). The SIM/RUIM card features memory and holds key configurations 351 and other information 353 such as identification and subscriber related information. With a properly enabled electronic device 300, two-way communication between the electronic device 300 and communication network 319 is possible.

If the electronic device 300 is enabled as described above or the communication network 319 does not require such enablement, the two-way communication enabled electronic device 300 is able to both transmit and receive information from the communication network 319. In order to communicate with the communication network 319, the electronic device 300 in this example embodiment is equipped with an integral or internal antenna 318 for transmitting communication signals to the communication network 319 and another antenna 316 for receiving communication signals from the communication network 319. Alternatively, a single antenna (not shown) may be utilized for transmitting and receiving communication signals. The antenna or antennae (316, 318) may be optionally externally mounted on the electronic device 300.

When equipped for two-way communication, the electronic device 300 includes a communication subsystem 311. As is understood in the art, this communication subsystem 311 supports the operational needs of the electronic device 300. The subsystem 311 includes a transmitter 314 and receiver 312 including the associated antenna or antennae 316, 318 as described above, local oscillators (LOs) 313, and a processing module 320, which is shown as a digital signal processor (DSP) 320 in this example.

Communication by the electronic device 300 with the wireless network 319 may be any type of communication that both the wireless network 319 and electronic device 300 are enabled to transmit, receive, and process. In general, these communications may be classified as voice and data. Voice communication generally refers to communication in which signals for audible sounds are transmitted by the electronic device 300 through the communication network 319. Data generally refers to all other types of communication that the electronic device 300 handles within the constraints of the wireless network 319.

Example device programs that depend on data include email, contacts, and calendars. For each such program, synchronization with home-based versions of the programs may be desirable for either or both long-term and short-term utility. As an example, emails are often time-sensitive, thus substantially real-time synchronization may be desired. Contacts, on the other hand, may be updated less frequently without inconvenience. Therefore, the utility of the electronic device 300 is enhanced when connected within a communication system, and when connected on a wireless basis in a network 319 in which voice, text messaging, and other data transfer are accommodated.

While the above description generally describes the systems and components associated with a handheld electronic device, the electronic device 300 may be another communication device such as a PDA, a laptop computer, desktop computer, a server, or other communication device. In those embodiments, different components of the above system might be omitted in order provide the desired electronic device 300. Additionally, other components not described above may be required to allow the electronic device 300 to function in a desired fashion. The above description provides only general components and additional components may be required to enable the system to function.

Figure 4:
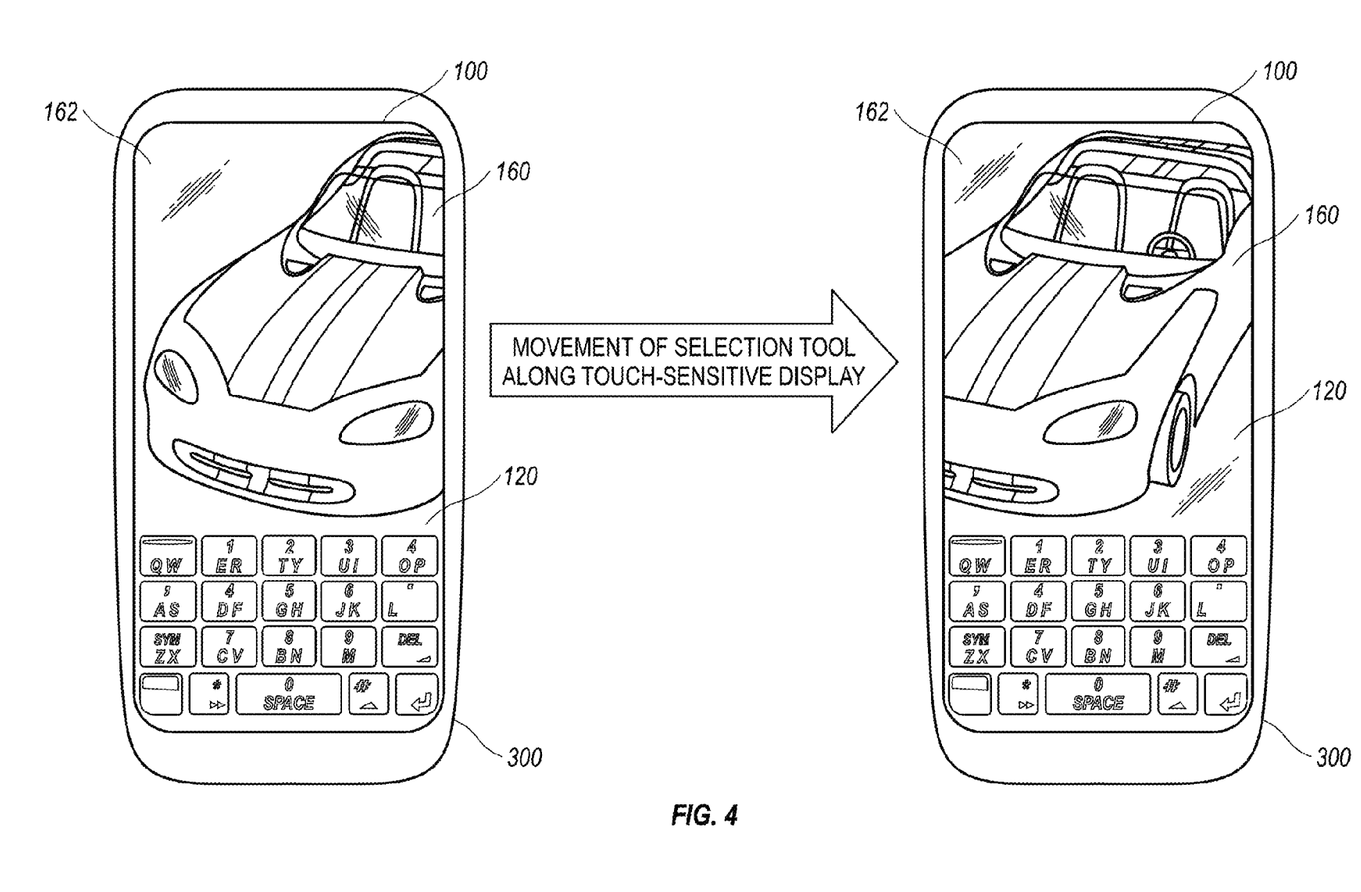
FIG. 4 illustrates panning an image on the graphical user interface.
Figure 5:
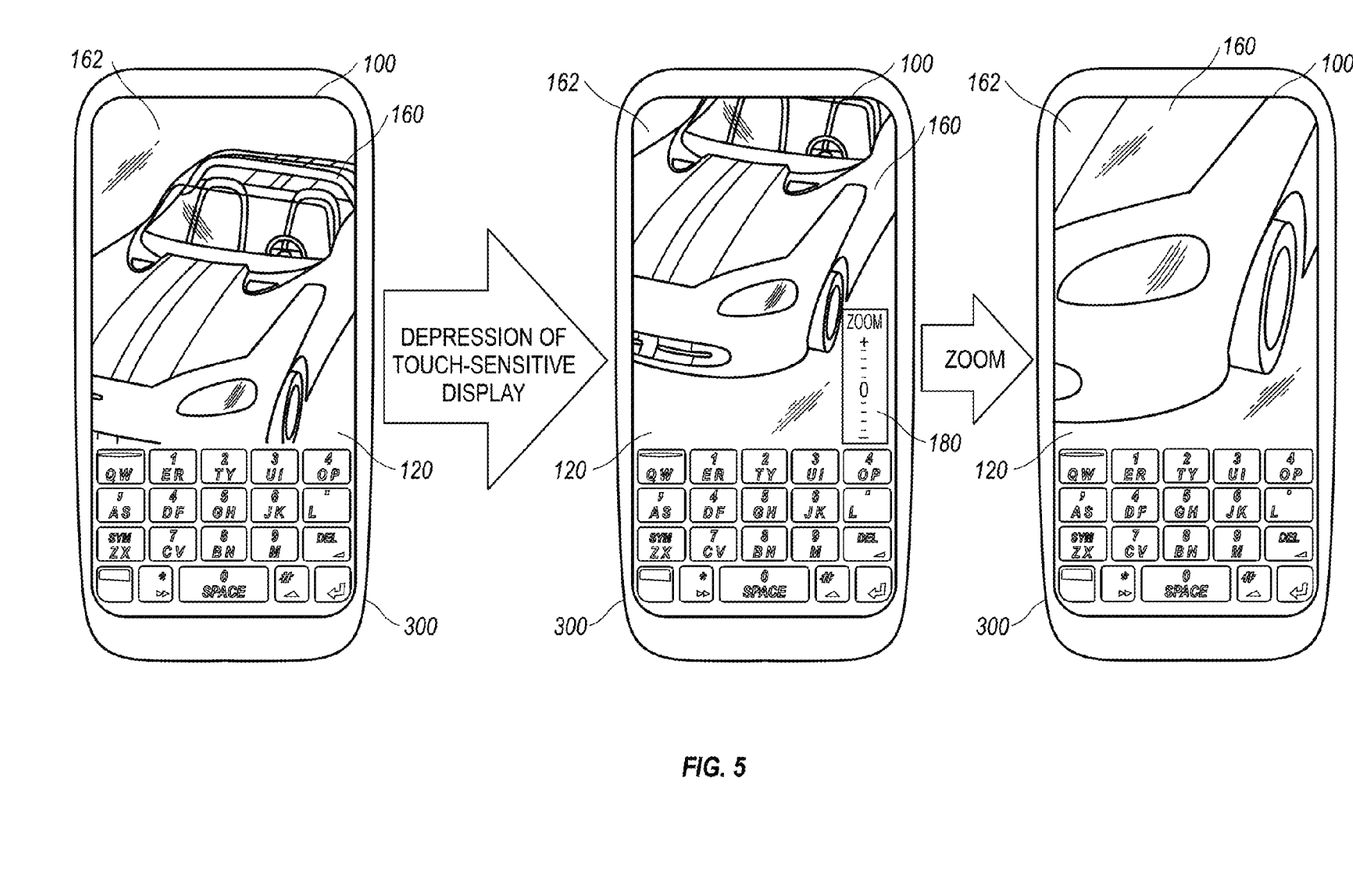
FIG. 5 illustrates zooming into an image on the graphical user interface.

FIG. 1 shows an example graphical user interface (GUI) 162 for a handheld electronic communication device 300. One of a plurality of images 160, which may be for example user-selectable images, is illustrated on the display screen 322 of the touch-sensitive display 100. As shown in FIG. 4, an image displayed by the GUI 162 may be panned when an object, such as a selection tool 150, moves along the display screen 322. As shown in FIG. 5, zooming on the image 160 occurs in response to depressing the display screen 322, for example with the selection tool 150, with a force sufficient to equal or in excess of a threshold value that is detected by the force sensor 130, which threshold value is correlated as a depression. Zooming and panning within the image 160 increases selection accuracy within the image 160. More accurate position of the selection tool over the image 160 is facilitated by enlarging the selectable area of the image 160.

Figure 6:
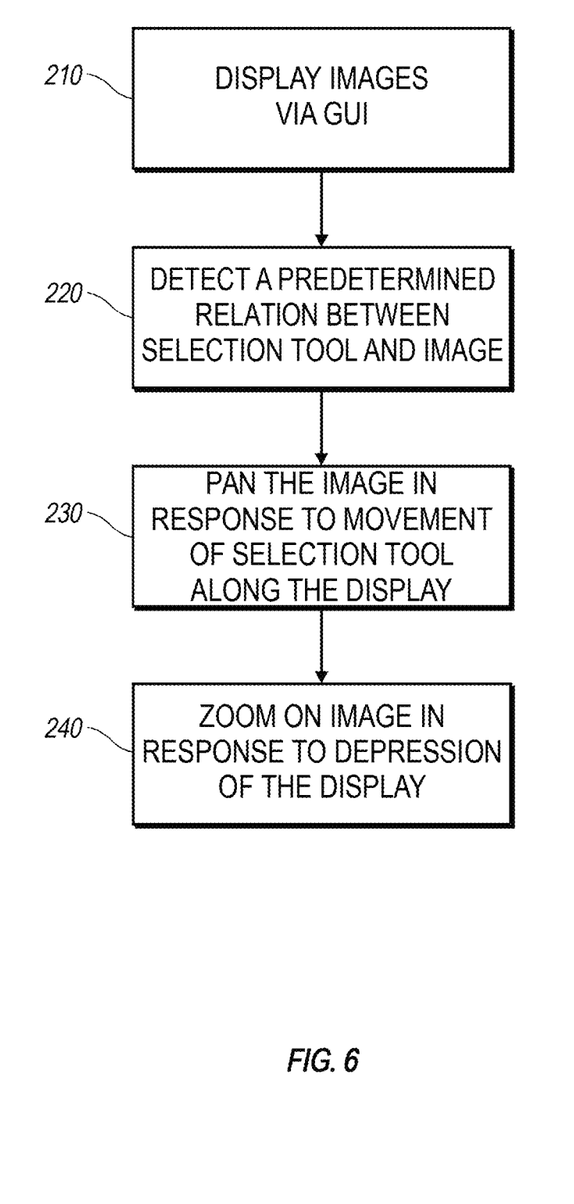
FIG. 6 is a flowchart showing an example method for modifying display of an image displayed via a graphical user interface of a touch-sensitive display.

The flowchart of FIG. 6 depicts the steps of a method for modifying the display of an image displayed via a GUI 162 of a touch-sensitive display 100 of a handheld electronic communication device 300. One or more images 160 are displayed 210, for example, via a GUI 162. Example images 160 include graphics, images, text, webpages (including web links), maps, or the like. A predetermined relation between a physical object, such as a selection tool 150, and the images 160 on the touch-sensitive display 100 is detected 220. The predetermined relation is a relation, which may vary, between the selection tool 150 and an image, icon, or other displayed item. The touch-sensitive display 100 evaluates the relation between the selection tool 150 and the image to determine whether a touch has occurred. For example, the relation may be a capacitance value considered to be a touch by the selection tool. The selection tool 150 may be one or more of a variety of different selection tools, including a finger of a user, a conductive stylus, a pen, a writing instrument, and the like. The image is panned 230 in response to movement of the selection tool 150 along the touch-sensitive display 100. In some embodiments, the selection tool 150 contacts a surface of the touch-sensitive display 100, and in other embodiments, movement of the selection tool 150 may be detected without the selection tool contacting the surface of the touch-sensitive display 100. The touch-sensitive display 100 may include a touch location sensor 110 that detects the selection tool 150 being spaced apart from the touch-sensitive display 100. The image 160 is zoomed on 240 in response to depression, for example by the selection tool 150, of the touch-sensitive display 100. The zoom may be performed first to a predetermined level, and a menu may be displayed to the user for further selection. In other example embodiments, the menu may be shown for user selection prior to performing the zoom. The image 160 may optionally be highlighted in response to detection of a predetermined relation between the selection tool 150 and the image 160.

The touch-sensitive display 100 may optionally be configured to the level of force exerted on the display 100, where the amount of force exerted on the display 100 determines the feature activated by the user. Depression of the touch-sensitive display 100 may comprise applying force to the touch-sensitive display 100 such that the switch 140 is contacted and subsequently activated by the touch-sensitive display 100. Such a depression may be referred to as a click on the touch-sensitive display 100. When the force detected by the force sensors 130 is relatively small, such that the switch 140 is not activated, but the force is detectable, a tap on the touch-sensitive display 100 occurs. The tap may be utilized to select the image 160 on the touch-sensitive display 100 or to activate other features, such as a cursor as described in FIG. 7.

Although the examples described make use of a single image, the image displayed on the touch-sensitive display 100 may be a plurality of images, such as icons on a home screen, images on a webpage, photographs in a folder, attachments to an email, and so forth.

As illustrated in FIG. 4, an image 160 on a touch-sensitive display 100 depicts a hood of a car. When movement of the selection tool 150 is detected along the touch-sensitive display 100, the image 160 moves in the direction of the movement, thereby panning the image 160. In this example, the movement of the selection tool 150 took place in the rightward direction, and the image 160 is panned to right.

Zooming on the image 160 is shown on the touch-sensitive display 100 in FIG. 5. In this example, when depression of the touch-sensitive display 100 occurs, e.g., via a click or tap, a zoom menu 180 is presented to provide the user with shortcut zoom commands such as a zoom in or a zoom out command. As mentioned above, the zoom menu 180 may be displayed after an initial zoom level is input. The zoom menu 180 may be deactivated by removing the selection tool 150 from the display screen 322 for more than a predetermined period of time, which may be user-selectable. Alternatively, the zoom menu 180 may be deactivated if the user taps the touch-sensitive display 100 with the selection tool 150 by contacting the touch-sensitive display 100 and subsequently removes the selection tool 150 from the touch-sensitive display 100. Once the desired level of zoom is selected from the menu, the GUI 162 operates at the desired level.

Figure 7:
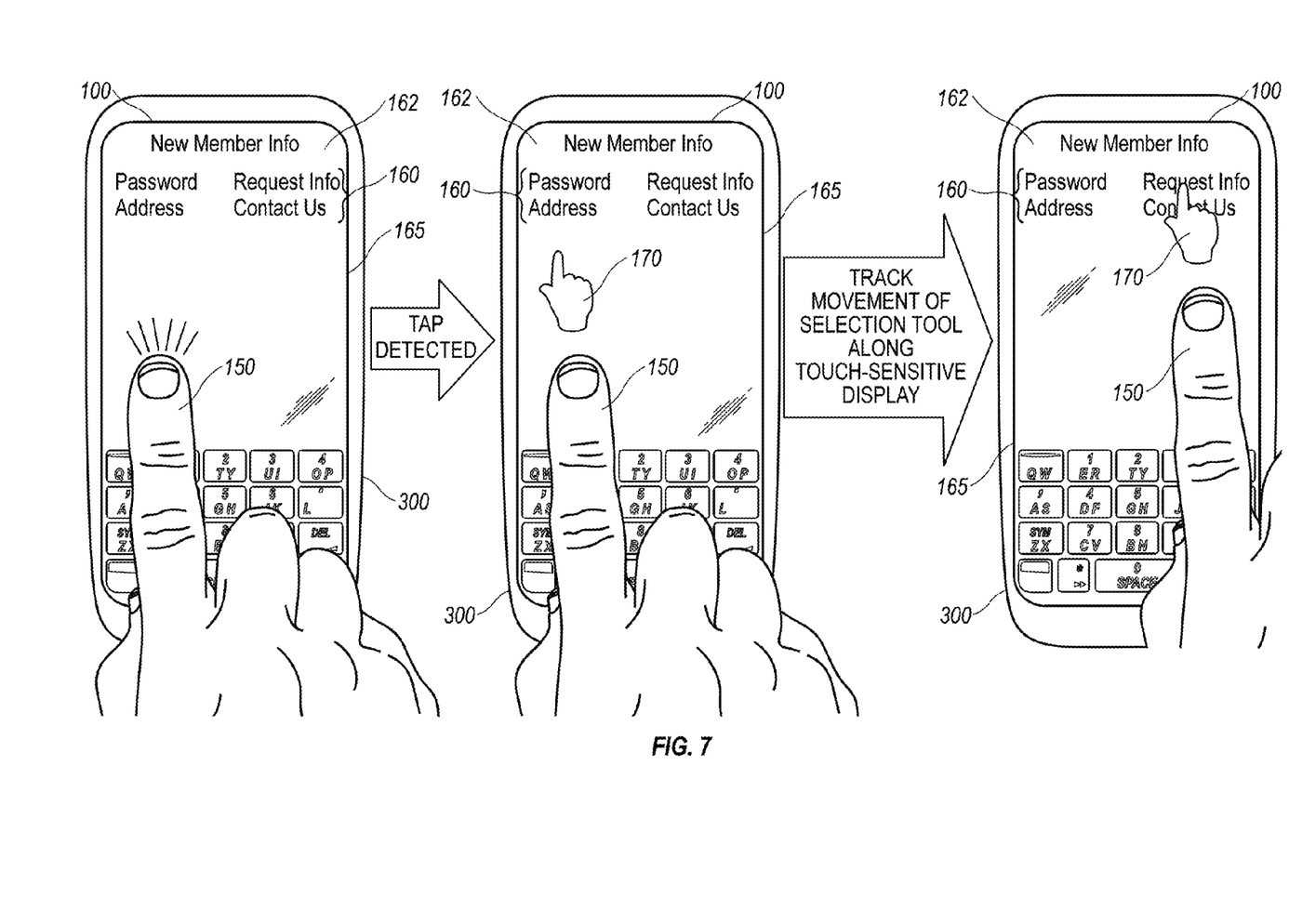
FIG. 7 illustrates tracking location data of a selection tool by providing a visual indication of the selection tool's position on the display screen.

Movement of the selection tool 150 may be tracked on the display screen 322 by providing a visual indication of the selection tool 150 and its position on the display screen 322. As shown in the example of FIG. 7, a cursor 170 is activated after detection of a tap by the selection tool 150 on the touch-sensitive display 100. In the example of FIG. 7, the selection tool 150 is a finger, and the tap is detected from contact of the finger with the touch-sensitive display 100 by the force sensor 130. The cursor 170 is illustrated as a hand. The cursor 170 may optionally be displayed as a pointer, a caret, an image, or other suitable figure. The cursor 170 may change from pointer, to finger, to text cursor, and so forth depending on which image 160 is highlighted or displayed. The cursor 170 moves on the touch-sensitive display 100 in response to detected movement of the selection tool 150 in relation to the touch-sensitive display 100, as displayed by the middle and right images in FIG. 7. In one embodiment, depression of the touch-sensitive display 100, for example by the selection tool 150, with a predetermined relation to the image 160 facilitates selection of the image 160. For example, once the cursor 170 is positioned over the image 160, for example the "Request Info" text, and a depression is detected, the software associated displays the information associated therewith. Alternatively, selection of the image 160 may be accomplished by tapping the touch-sensitive display 100 with the selection tool 150 in a predetermined relation to the image 160, e.g., on or within a short distance of the image. The touch-sensitive display 100 may accommodate panning the image 160 in response to cursor movement at an edge of the boundary 165 of the touch-sensitive display 100. An example of a boundary 165 is illustrated on the left side of the GUI 162 of the rightmost device 300. Other boundaries are located on the top, right, and bottom of the GUI 162 of FIG. 7.

The cursor 170 may be deactivated and the default operating mode may be entered when a second tap by the selection tool 150 on the touch-sensitive display 100 is detected. In the default operating mode after the cursor 170 is deactivated, the user may pan across the image 160 by moving the selection tool 150 along the touch-sensitive display 100, and the user may zoom on the image 160 by depressing the touch-sensitive display 100, for example, with the selection tool 150.

In another example embodiment, the cursor 170 is deactivated and the default operating mode is entered when removal of the selection tool 150 from the touch-sensitive display 100 is detected for a predetermined period of time. In the default operating mode after the cursor 170 has been deactivated, the user may pan across the image 160 by moving the selection tool 150 along the touch-sensitive display 100, and the user may zoom on the image 160 by depressing the touch-sensitive display 100, for example, with the selection tool 150.

Alternatively, the cursor 170 may be deactivated and the default operating mode entered when the user clicks on a mode button displayed on the display screen 322, for example, with the selection tool 150. In such an embodiment, the mode button may be located or displayed near the lower portion of the display screen 322, on a browser bar having a plurality of browser control buttons, such as forward buttons, back buttons, mode buttons, or the like. In the default operating mode, after the cursor 170 is deactivated, the user may pan across the image 160 by moving the selection tool 150 along the touch-sensitive display 100, and the user may zoom on the image 160 by depressing the touch-sensitive display 100, for example, with the selection tool 150.

As described herein, one example embodiment is an electronic device 300 including a touch-sensitive display 100. The electronic device 300 includes a body 371 housing a touch-sensitive display 100 comprising a display screen 322, a touch location sensor 110, and a transparent cover lens 120. The electronic device 300 also includes a switch 140 coupled to the cover lens 120. Additionally, a microprocessor 338 is included and is in data-communication with the display screen 322, the touch location sensor 110, and the switch 140. The microprocessor 338 is capable of running software programmed to display a GUI 162 including a plurality of images 160 on the touch-sensitive display 100. The software may also detect a physical selection tool 150 with a predetermined relation to the image 160 on the display 100. Additionally, the software may pan the image 160 in response to movement of the selection tool 150 along the touch-sensitive display 100. Furthermore, the software may zoom on the image 160 in response to detecting a threshold force of depression of the touch-sensitive display 100 by the selection tool 150. In other embodiments, features as described above may also be incorporated into the electronic device 300.

A computer-readable medium has stored instructions for execution by a processor of a mobile device and for causing the mobile device to implement the method of claim 1. A computer-readable medium has stored instructions for execution by a processor of a mobile device and for causing the mobile device to implement the method herein. The computer program may cause a computer to display an image on the touch-sensitive display 100. The computer program may further cause the computer to detect a predetermined relation between a selection tool 150 and the images 160 on the touch-sensitive display 100 and pan the image 160 in response to movement of the selection tool 150 along the touch-sensitive display 100. The computer program may further cause the computer to zoom on the image 160 in response to detecting a threshold force of depression of the touch-sensitive display 100. The computer-readable medium may employ the additional features as described above.

An improved system and method of displaying images increases the accuracy in selection of images and selection within images on touch-sensitive displays of portable electronic devices is provided. A system and method for panning, zooming, and tracking cursor movement via a GUI on a touch-sensitive display.

Example embodiments have been described hereinabove regarding the implementation of a method and system for displaying an image on network operable electronic devices 300. While the embodiments described herein are directed to particular implementations of the portable electronic device and the method of controlling the portable electronic device, modifications and variations may occur to those skilled in the art. All such modifications and variations are believed to be within the sphere and scope of the present disclosure. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
displaying an image via a graphical user interface on a touch-sensitive display of an electronic device;
detecting a predetermined relation between a selection tool and the image;
panning the image in response to movement of the selection tool along the touch-sensitive display;
detecting a depression of the touch-sensitive display;
determining if the depression activated a physical switch, wherein the physical switch activates in response to a force associated with the depression being greater than a given threshold;
in response to determining that the depression activated the physical switch, zooming on the image; and
in response to determining that the depression fails to activate the physical switch, performing at least one function that is different from zooming on the image.

2. The method of claim 1, wherein the image is highlighted in response to detection of the predetermined relation between the selection tool and the image.

3. The method of claim 1, wherein the selection tool is conductive and detecting comprises detecting the selection tool spaced from the touch-sensitive display.

4. The method of claim 1, wherein the selection tool is conductive and detecting comprises detecting the selection tool touching the touch-sensitive display.

5. The method of claim 1, further comprising displaying a zoom menu in response to the depression activating the physical switch.

6. The method of claim 5, further comprising deactivating the zoom menu when the selection tool is not detected for more than a predetermined time.

7. The method of claim 1, further comprising detecting a first tap of the selection tool on the touch-sensitive display and activating a cursor on the touch-sensitive display.

8. The method of claim 7, further comprising moving the cursor on the touch-sensitive display in response to movement of the selection tool in relation to the touch-sensitive display.

9. The method of claim 8, further comprising detecting a depression of the touch-sensitive display and selecting the image with a predetermined relation to the detected depression of the touch-sensitive display.

10. The method of claim 7, further comprising panning the image in response to cursor movement at an edge of a boundary of the touch-sensitive display.

11. The method of claim 10, further comprising detecting a second tap of the touch-sensitive display and deactivating the cursor.

12. The method of claim 11, further comprising activating a default operating mode after the cursor has been deactivated, wherein the default operating mode facilitates panning of the image in response to selection tool movement along the touch-sensitive display and zooming on the image in response to the depression activating the physical switch.

13. The method of claim 1, further comprising detecting a first tap on the touch-sensitive display and activating a cursor, wherein the cursor tracks the movement of the selection tool in relation to the touch-sensitive display, and further comprising detecting a subsequent tap of the touch-sensitive display by the selection tool and selecting an image with a predetermined relation to a location of the detected subsequent tap.

14. The method of claim 13, further comprising detecting removal of the selection tool from the touch-sensitive display for a predetermined period of time, deactivating the cursor, and activating a default operating mode, wherein the default operating mode facilitates panning of the image in response to selection tool movement along the touch-sensitive display and zooming on the image in response to the depression activating the physical switch.

15. The method of claim 1, wherein the switch is contacted and subsequently activated by a force of the depression satisfying the given threshold.

16. The method of claim 1, wherein the predetermined relation is a capacitance value.

17. A non-transitory computer readable medium having stored instructions for execution by a processor of a mobile device and for causing the mobile device to implement the method of claim 1.

18. An electronic device comprising:
a physical switch and a touch-sensitive display;
a microprocessor separate from the switch and configured to:
display an image on the touch-sensitive display;
detect a predetermined relation between a selection tool and the image;
pan the image in response to movement of the selection tool along the touch-sensitive display;
detect depression of the touch-sensitive display;
determine if the depression activated the physical switch, wherein the physical switch activates in response to a force associated with the depression being greater than a given threshold;
in response to determining that the depression activated the physical switch, zoom on the image; and
in response to determining that the depression fails to activate the physical switch, perform at least one function that is different from zooming on the image.

19. The electronic device of claim 18, where the depression is detected by detecting depression of the touch-sensitive display by the selection tool.

20. The electronic device of claim 18, wherein the switch is contacted and subsequently activated by a force of the depression satisfying the given threshold.

21. The electronic device of claim 18, wherein the switch is disposed beneath the touch-sensitive display.

22. The method of claim 1, wherein the switch is disposed between the touch-sensitive display and a housing of the electronic device.

23. A method comprising:
displaying an image on a touch-sensitive display of an electronic device;
detecting a predetermined relation between a selection tool and the image;
panning the image in response to movement of the selection tool along the touch-sensitive display;
detecting depression of the touch-sensitive display;
after movement of the selection tool, determining if the depression activated a physical switch disposed below the touch-sensitive display, wherein the physical switch activates in response to a force associated with the depression being greater than a given threshold;
in response to determining that the depression activated the physical switch, zooming on the image; and
in response to determining that the depression fails to activate the physical switch, performing at least one function that is different from zooming on the image.

24. The method of claim 23, wherein the physical switch is disposed between the touch-sensitive display and a housing of the electronic device.

25. The method of claim 23, wherein a processor is configured to display the image and the physical mechanical switch is a separate device from the processor.

26. The method of claim 1, wherein the physical switch is mechanically actuated.

27. An electronic device as in claim 18, wherein the physical switch is a mechanical switch.

28. The method of claim 23, wherein the physical switch is a mechanical switch.

29. A method comprising:
displaying an image on a touch-sensitive display of an electronic device;
detecting a predetermined relation between a selection tool and the image;
panning the image in response to movement of the selection tool along the touch-sensitive display; and
detecting a touch on the image, which touch depresses the touch-sensitive display;
after movement of the selection tool, determining if the depression activated a physical switch disposed below the touch-sensitive display, wherein the physical switch activates in response to a force associated with the depression being greater than a given threshold;
in response to determining that the depression activated the physical switch, zooming on the image; and
in response to determining that the depression fails to activate the physical switch, performing at least one function that is different from zooming on the image.

30. The method of claim 29, wherein the touch is detected while no zoom button or zoom menu is displayed.

31. The method of claim 29, wherein the touch is detected anywhere on the image.

32. The method of claim 29, further comprising displaying a zoom menu only in response to the depression activating the physical switch.

33. The method of claim 1, wherein detecting depression comprises detecting a touch on the image, which touch depresses the touch-sensitive display.

34. The method of claim 18, wherein to detect depression comprises to detect a touch on the image, which touch depresses the touch-sensitive display.

35. The method of claim 23, wherein detecting depression comprises detecting a touch on the image, which touch depresses the touch-sensitive display.

* * * * *